Aug. 28, 1928.
L. G. NILSON
1,682,305
INTERNAL COMBUSTION ENGINE AND METHOD FOR OPERATING SAME
Filed Sept. 27, 1921  2 Sheets-Sheet 1
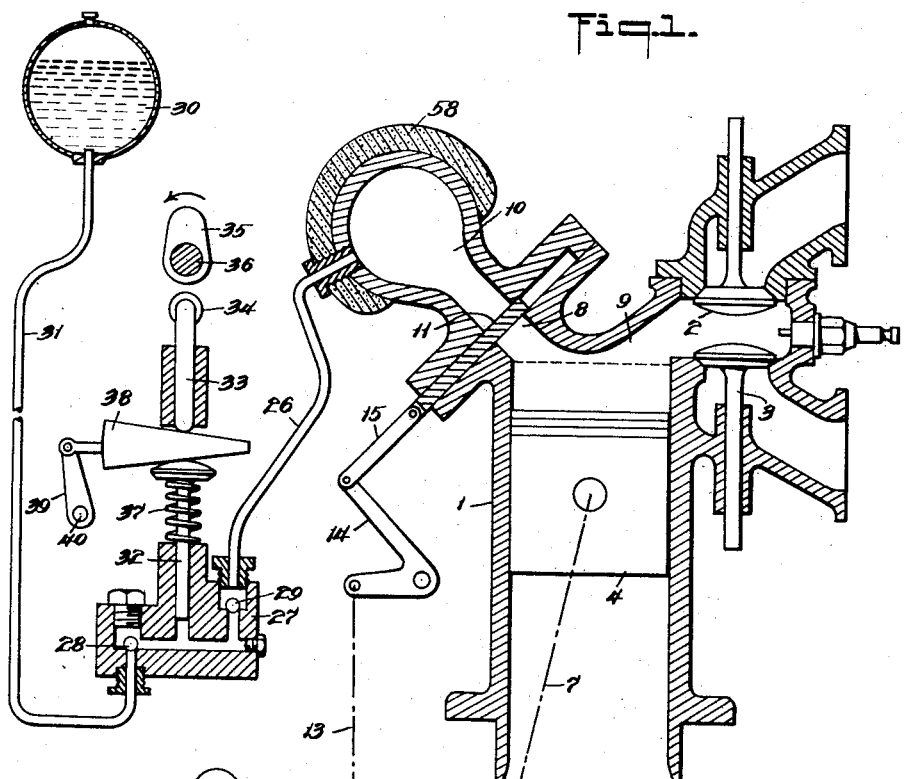

Aug. 28, 1928.
L. G. NILSON
1,682,305
INTERNAL COMBUSTION ENGINE AND METHOD FOR OPERATING SAME
Filed Sept. 27, 1921    2 Sheets-Sheet 2
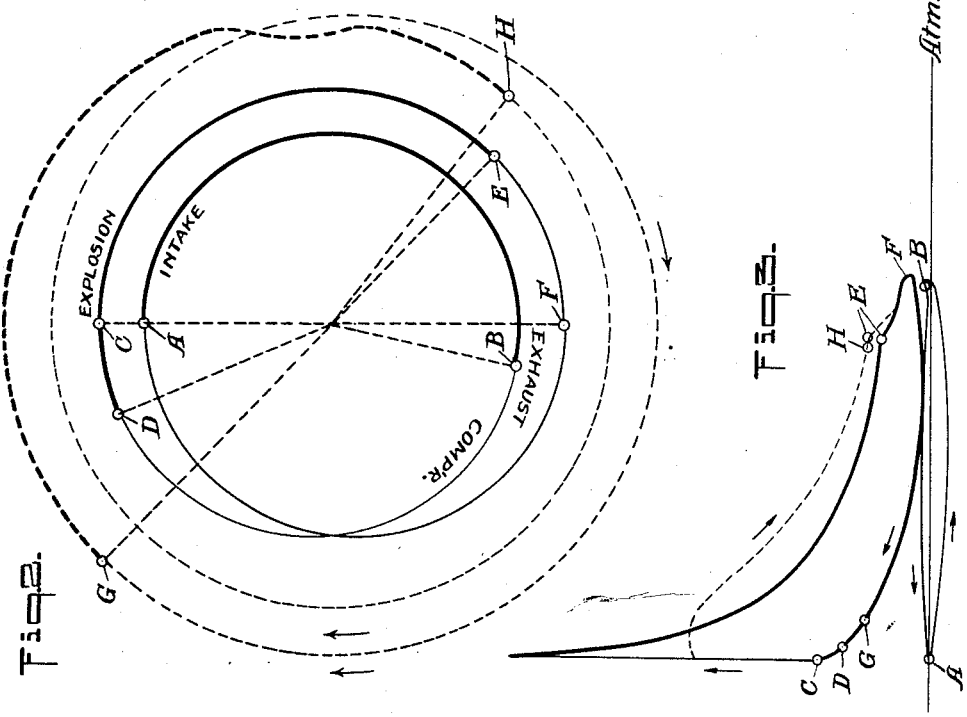
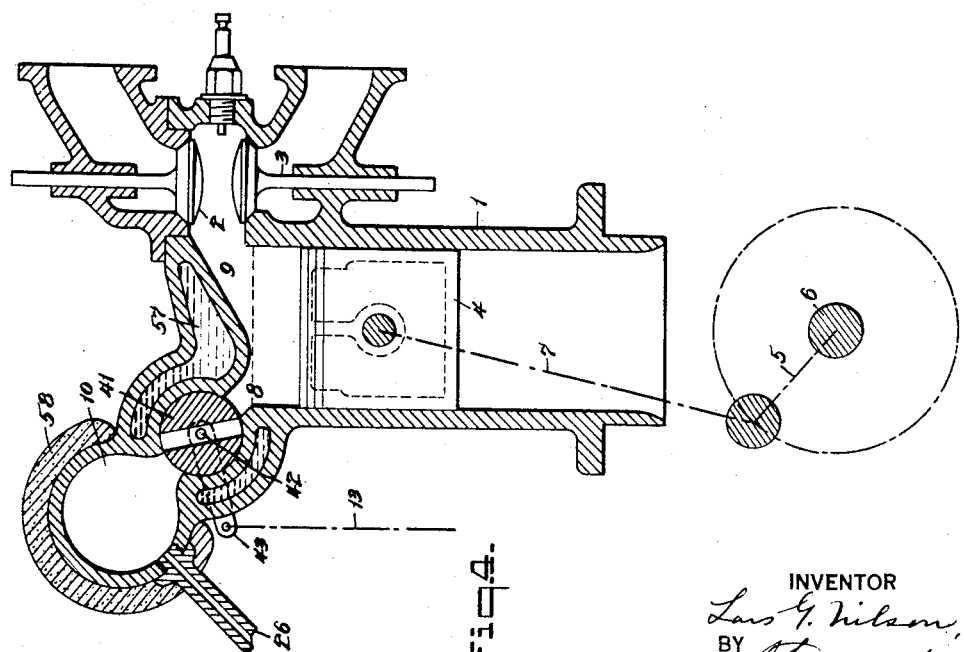
INVENTOR
Lars G. Nilson,
BY
ATTORNEY Patented Aug. 28, 1928.

1,682,305

UNITED STATES PATENT OFFICE.

LARS G. NILSON, OF HOBOKEN, NEW JERSEY.

INTERNAL-COMBUSTION ENGINE AND METHOD FOR OPERATING SAME.

Application filed September 27, 1921. Serial No. 503,549.

This invention relates to internal combustion engines and a method for operating the same, and more particularly to a means for increasing the thermal efficiency of such engines while lowering the maximum pressure of the working fluid therein. The operation of all internal combustion engines, whether reciprocating or rotary, and whether two or four cycle, consists in introducing a gaseous charge into a closed space, compressing the charge, igniting it, allowing the ignited charge to perform work while expanding, and finally in exhausting the spent products of combustion. The gaseous charge may be a combustible mixture, as in ordinary engines, or it may be air into which liquid fuel is injected on compression, as in engines of the Diesel type; the principle above stated being applicable in either case. The temperature and pressure of the charge immediately after ignition are always excessive, and are generally recognized to be the cause of nearly all the failings to which internal combustion engines are subject. The object of this invention is to reduce this excessive temperature and pressure, and to store the energy which it represents and deliver this energy to the expanding gases at a time when it can be fully utilized; also to exhaust the spent gases at a lower temperature than otherwise possible, thereby abstracting from the same the greatest possible amount of heat and increasing the thermal efficiency of the engine.

In carrying out my invention, I connect an auxiliary chamber with the combustion space of the engine cylinder. Communication between this chamber and cylinder is controlled by means of a properly timed valve, which is closed at about the end of the working stroke and just before the exhaust valve opens. The spent gases are now exhausted and a fresh charge introduced into the cylinder. When this charge is compressed to about the pressure of the gases within the auxiliary chamber, communication with the latter is now opened; the compression of the charge is completed, ignition takes place, and the piston is driven forward. It will be seen that when the charge is ignited, a portion of its energy will go into heating and compressing the gases within the auxiliary chamber, rather than to heating and compressing the charge itself to an excessive degree; and that during the working stroke the gases within the auxiliary chamber will expand and do work upon the piston, thus delivering the energy stored in them at the beginning of the stroke. As the initial temperature of the ignited charge is lowered, the exhaust temperature will be lowered and the thermal efficiency will be increased. By closing communication between the auxiliary chamber and the cylinder just before exhaust takes place, the pressure of the gases trapped within the auxiliary chamber will be sufficient to maintain proper compression of the charge on reestablishing communication before completion of compression. In many cases the effectiveness of my device may be increased by the addition of water to the auxiliary chamber, thus absorbing heat at the beginning of the working stroke and delivering the heat energy in the form of work to the piston during the latter portion of the stroke.

With these and other objects in view, I have devised the apparatus embodying my invention, as described in the following specification, and illustrated in the accompanying drawings, of which Figure 1 is a side elevation, mainly in section, of the device attached to an internal combustion engine, Fig. 2 is a diagrammatic representation of the events occurring in the cycle of the engine, Fig. 3 is an indicator card diagram, Fig. 4 shows a modified form of valve, and Fig. 5 shows a further modification in the form of valve.

Fig. 6 is a section taken on the line X Y of Fig. 5.

Referring to the drawing, 1 represents the cylinder of an internal combustion engine, having intake and exhaust valves 2 and 3 respectively. Piston 4, reciprocating within cylinder 1, drives crank 5 and shaft 6 through connecting rod 7. An opening 8, communicating with combustion space 9, is provided in cylinder 1; and attached to cylinder 1 by flanges or other suitable means is auxiliary chamber 10, having its interior communicating with opening 8. Between the interior of chamber 10 and combustion space 9 is a valve 11, actuated by cam 12 through link 13, bell crank 14 attached thereto, and link 15 connecting bell crank 14 and valve 11. Cam 12 is keyed or otherwise securely fixed to cam shaft 16, driven by gears 17 and 18 from crank-shaft 6. In a four cycle engine the gear ratio is such that shaft 16 makes one revolution to every two of shaft 6. In many engines the ordinary valve timing cam shaft may be utilized for this purpose. Link 19, pivoted as at 20, holds cam roller 21 to which it is attached, from lateral or tangential movement, and link 13 may be pivoted to link 19 or connected directly with roller 21. The movement of valve 11 may be advanced or retarded by rotating pivot point 20 about the axis of cam shaft 16, by lever 22 pivoted on said axis and carrying pivot point 20; lever 22 being clamped in any desired setting by nut 23 and bolt 24 in sector 25.

Water is introduced into chamber 10 by pipe 26 leading from pump 27 having entrance and discharge valves 28 and 29 respectively, valve 28 being supplied from reservoir 30 by pipe 31. Plunger 32 of pump 27 is actuated on its working stroke by rod 33, driven through roller 34 and cam 35 by shaft 36. Plunger 32 is returned by spring 37. Wedge 38, interposed between rod 33 and plunger 32, controls the effective length of rod 33, and thus by its position determines the length of stroke of plunger 32. Adjustment of wedge 38 is effected through crank 39 secured to shaft 40, which may be rotated either manually or by a governor controlled device. Water injection is made preferably in timed relation to the stroke, and in such cases shaft 36 may be identical with shaft 16, being shown separate merely for convenience of representation. Cam 35 is set to deliver the water immediately after the closing of valve 11, thereby allowing maximum time for the generation of steam in chamber 10.

In Fig. 4 is shown a modification in which rotary (or oscillating) valve 41 is substituted for slide valve 11. Valve 41 is actuated by shaft 42 carrying crank arm 43, which may be directly attached to lever 13.

In Figs. 5 and 6 is shown a modification in which poppet valve 44 is subtituted for slide valve 11. Valve 44 is clamped to arm 45 to provide for proper seating, while arm 45 has a hub portion keyed on, or otherwise rigidly secured to, shaft 47 passing through the latter. Arm 48, fixed to shaft 47, is pivoted to yoke 49 carrying sleeve 50 through which passes rod 13. Secured to rod 13 is collar 51, and between the latter and the end of sleeve 50 is compression spring 52. Adjusting and lock nuts 53 and 54 respectively on the end of rod 13 maintain spring 52 in suitable compression. Spring 52 will take up any slight inaccuracy in the throw of crank arm 48 in seating valve 44. Shaft 47 has a shoulder 55 which, together with the end of bushing 56 through which shaft 47 passes, constiutes a ground joint to prevent loss of pressure. Shoulder 55 should, of course, be of small enough diameter to pass through the opening into which bushing 56 fits, thus facilitating assembly. This arrangement is preferable to a stuffing box in cases where the temperature would injure ordinary packing.

In any of the above described forms, chamber 10 may be made in two flanged parts, as shown in Figs. 5 and 6, to facilitate access to valves 11, 41 or 44 for grinding or for assembling.

Water jacketing 57 may be provided about valves 11, 41, or 44, as shown in Figs. 4 and 5. Chamber 10 is elsewhere blanketed with insulating material, as at 58, to conserve all the heat possible. Cylinder 1 may be cooled by any suitable means.

The operation of the device for a four cycle engine will be considered in relation to Figs. 2 and 3. The reference points of the former are taken on radii corresponding to the various angular positions of crank 5, assuming clockwise rotation; while the reference points of the latter correspond, with respect to their abscissas, to the various positions of piston 4. The ordinates of the points on Fig. 3 represent the pressure per unit area of the working fluid, and the dotted line represents the pressures during the working stroke when using the auxiliary chamber, as contrasted with the pressures on ordinary engines represented by the solid line. Points represented by the same letter on either diagram represent identical phases. The point A represents the beginning of the intake stroke. Piston 4 is at the beginning of its stroke; crank 5 is on inner dead center; intake valve 2 is in the act of opening; exhaust valve 3 has just closed. Cam 12 is so designed and so set that at this point valve 11 will be closed. Piston 4 now moves to outer dead center and begins its return stroke; intake valve 2 is closed at or about point B, and compression of the charge begins. When the compression stroke is about three-quarters complete, or at about the point where the pressure of the gases within chamber 10 will just about equal the pressure of the charge in cylinder 1, valve 11 is opened. This point is indicated by G. Piston 4 continues its inward stroke and ignition is effected at point D, at or before crank 5 reaches inner dead center at C. The flame, travelling away from the spark plug and gaining in intensity, instead of delivering a hammer blow to the piston, delivers a portion of its energy to the gases in chamber 10. As the working stroke proceeds, the energy stored in the ignited charge, and in the gases within chamber 10, is gradually expended in the form of useful work by driving the piston forward. The volume of expansive gas being increased by the contents of chamber 10, a greater pressure may be maintained as the piston moves into more advantageous positions for converting pressure into torque at the crank shaft. At point H, before outer dead center is reached, valve 11 is closed, and the expanded gases within chamber 10 are trapped. Immediately after point H, exhaust valve 3 opens at point E; outer dead center F is reached and the exhaust stroke is begun. As point A is again reached, exhaust valve 3 closes and intake valve 2 immediately opens.

Referring to Fig. 3, it will be seen that the pressure at G is about equal to the pressure at E; that is, the pressure of the charge at the opening of valve 11 is about equal to the pressure of the gases just before the opening of exhaust valve 3. Cam 12 is designed and set with that end in view, so that the opening of valve 11 will not lower the compression. As the charge is further compressed, a small amount will enter chamber 10, but will not have time to diffuse and mingle with the spent gases therein, and whatever slight mixing does take place in no way serves to hamper complete combustion. As ignition takes place, a certain amount of the pressure and heat resulting therefrom will go to compress and heat the gases in chamber 10, and the sharp pressure peak shown by the solid line in Fig. 3 will be avoided. But while the initial pressure is less, the fall of pressure as the cylinder volume increases will also be less, as the quantity of working fluid is now increased by the contents of chamber 10, and the dotted line will cross the solid line and indicate a higher mean effective pressure. Regarded from the standpoint of thermal efficiency, it will be apparent that the exhaust gases will be released at a lower temperature, because the excessive initial temperature has been reduced. Much of the heat absorbed by the cooling water and otherwise dissipated during the excessive initial temperature will also be saved, as such heat losses are directly proportional to the temperature difference between the burning mixture and the walls of the combustion chamber and cylinder. It is generally conceded that the greatest amount of wall loss occurs in the early part of the stroke, when the pressure and temperature are at maximum, and the piston speed is comparatively slow.

In Fig. 3 the upper solid line represents a typical and practical expansion curve in an ordinary engine without the auxiliary chamber. The dotted line just above this curve indicates a practical and typical expansion curve such as would be obtained from an engine using the auxiliary chamber in the manner described.

Not only will the application of the device increase the efficiency of the engine, but, by eliminating the excessive maximum pressure shown in Fig. 3, mechanical strains upon the wrist pin, crank bearings, etc., will be avoided, resulting in a smoother running engine, and permitting lighter construction; while by eliminating the excessive maximum temperature, cylinder lubrication will be facilitated. The lowering of the maximum temperature, and the raising of the mean effective pressure permit the development of power at a slower piston speed. This is especially advantageous for marine work. Liability to knocking, heating, breakage and similar evils will be almost entirely avoided.

By injecting water into chamber 10 in the manner described, the effectiveness of the latter will be increased in many cases, due to the absorption of heat by the steam and return of this energy to the piston during the working stroke in the form of pressure. The working temperature will be lowered and formation of carbon prevented.

While the above detailed explanation of the operation of the invention is made in connection with a four cycle reciprocating engine, it is clear that the invention may be applied to any type of internal combustion engine. On a two cycle engine there would be no reduction between gears 17 and 18.

Instead of the injection of water, as above described, into chamber 10, I consider also the injection of certain gases to be advantageous under certain conditions, especially in reducing temperature, and the injection of air, water, steam or other inert volatile substance or gas I consider within the scope of my invention.

What I claim is:

1. The combination with an internal combustion engine provided with a cylinder, piston, and means for supplying the fuel to and exhausting said cylinder, of a closed chamber connected with the engine cylinder adjacent the combustion space, a valve for closing said chamber from communication with said cylinder, and means for closing said valve just before the products of combustion are exhausted from said cylinder and for opening said valve just before ignition occurs.

2. The combination with an internal combustion engine provided with a cylinder, piston, and means for supplying the fuel to and exhausting said cylinder, of a closed chamber connected with the engine cylinder adjacent the combustion space, a valve for closing said chamber from communication with said cylinder, and means for closing said valve just before the products of combustion are exhausted from said cylinder and for opening said valve before ignition at substantially the same pressure at which said valve was closed.

3. The combination with an internal combustion engine provided with a cylinder, piston, and means for supplying the fuel to and exhausting said cylinder, of a closed chamber connected with said engine cylinder adjacent the combustion space and of a size adapted to reduce the ignition pressure a substantial amount and yet return absorbed heat to said cylinder during its power stroke, a valve for cutting off said chamber from communication with said cylinder, and a mechanism for closing said valve after the engine has completed at least a substantial portion of its power stroke and for opening the same just before ignition occurs.

4. The combination with an internal combustion engine provided with cylinders, pistons, and means for supplying fuel to and exhausting said cylinders, of means for removing from a cylinder at ignition a predetermined portion of the charge to reduce the pressure as ignition occurs, heat insulated means for holding said charge, and means permitting the passage of a predetermined portion of said extracted charge to a cylinder during the major portion of the power stroke thereof.

5. The combination with an internal combustion engine provided with cylinders, pistons, and means for supplying fuel to and exhausting said cylinders, of means for removing a predetermined portion of the products of combustion from a cylinder just before exhaust occurs, and means for placing said removed portion of the combustion products in communication with the charge in a cylinder during the compression stroke thereof, and before ignition occurs.

Signed at New York, in the county of Hudson and State of New Jersey, this 26th day of September, A. D. 1921.

LARS G. NILSON.